(12) United States Patent
Arviso

(10) Patent No.: US 6,505,879 B1
(45) Date of Patent: Jan. 14, 2003

(54) COLLAPSIBLE TRUCK BOX COVER

(76) Inventor: Oran J. Arviso, P.O. Box #821, Church Rock, NM (US) 87311

(*) Notice: Subject to any disclaimer, the term of this patent is extended or adjusted under 35 U.S.C. 154(b) by 0 days.

(21) Appl. No.: 09/887,230

(22) Filed: Jun. 22, 2001

(51) Int. Cl.[7] .................................................. B60P 7/02
(52) U.S. Cl. ................................... 296/100.18; 296/164
(58) Field of Search .................................. 296/159, 165, 296/100.17, 100.18; 135/88.01, 88.05, 88.13

(56) References Cited

U.S. PATENT DOCUMENTS

| | | | | |
|---|---|---|---|---|
| 4,263,925 A | * | 4/1981 | Arganbright | ......... 135/88.13 X |
| 4,813,734 A | * | 3/1989 | Hoover | .................. 296/100.17 |
| 5,186,513 A | * | 2/1993 | Strother | ............. 296/100.18 X |

FOREIGN PATENT DOCUMENTS

JP          359167326    *    9/1984    ............ 296/100.17

* cited by examiner

*Primary Examiner*—Dennis H. Pedder

(57) ABSTRACT

A collapsible truck box cover for providing protective shelter for the outdoors person. The collapsible truck box cover includes a frame assembly being adapted to be removably mounted upon a truck box and including curved elongate support members and also including elongate cross members; and also includes a plurality of connectors interconnecting the elongate support members and the elongate cross members; and further includes a sheet of material being securely and removably fastened about the frame assembly.

13 Claims, 5 Drawing Sheets

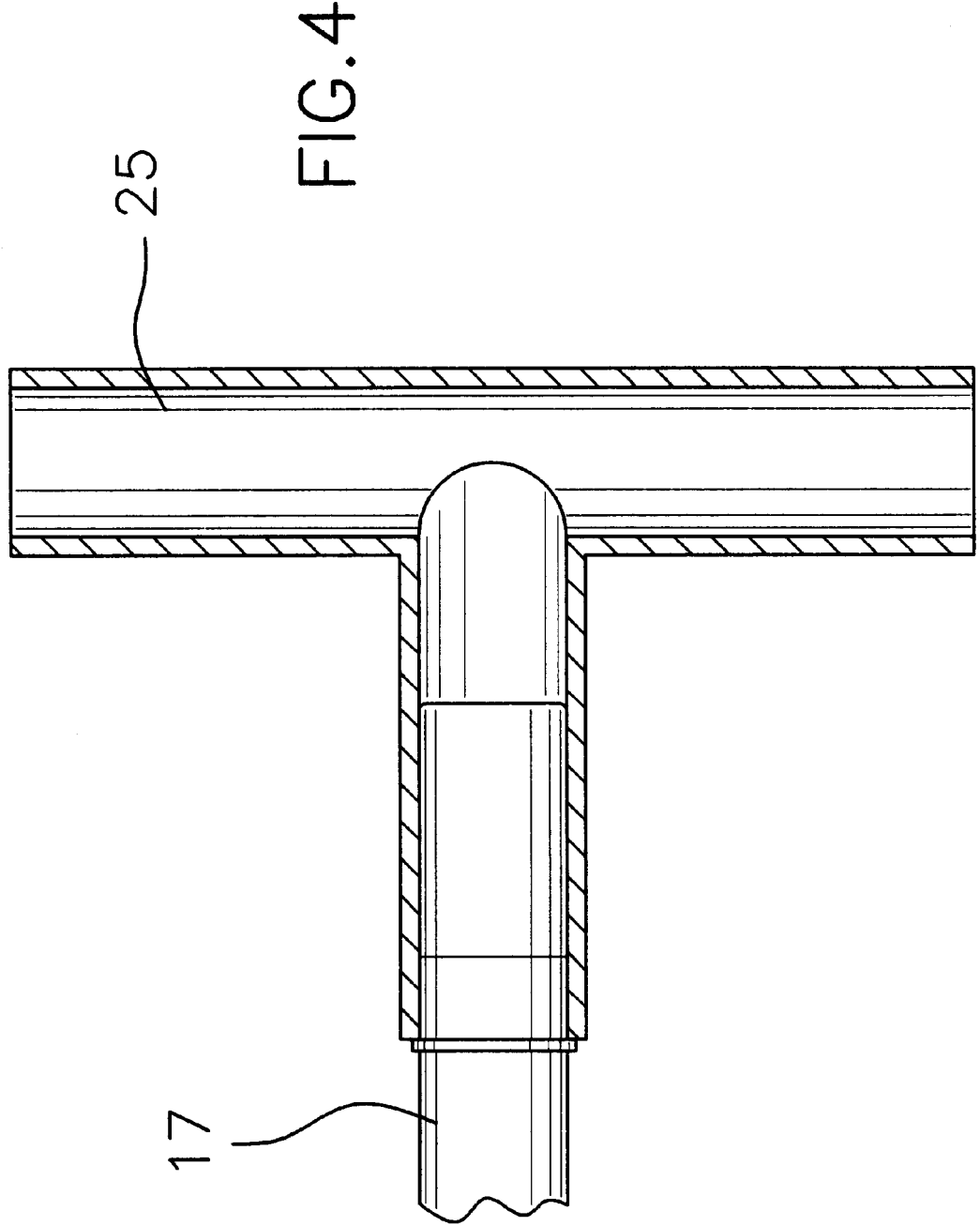

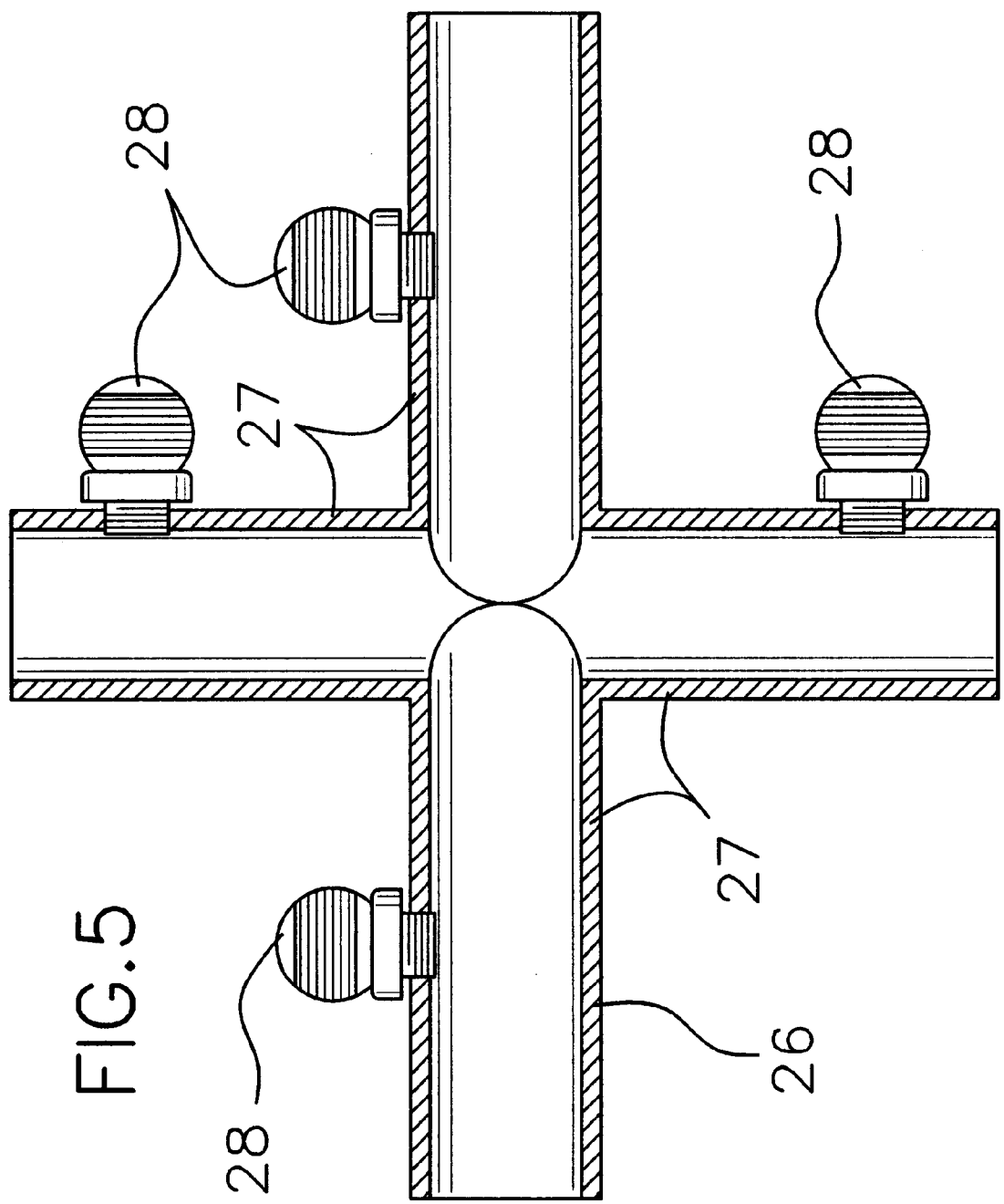

COLLAPSIBLE TRUCK BOX COVER

BACKGROUND OF THE INVENTION

1. Field of the Invention

The present invention relates to truck box covers and more particularly pertains to a new collapsible truck box cover for providing protective shelter for the outdoors person.

2. Description of the Prior Art

The use of truck box covers is known in the prior art. More specifically, truck box covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 6,000,745; 5,752,736; U.S. Pat. No. Des. 342,707; U.S. Pat. Nos. 4,272,119; 4,709,956; and 5,353,826.

While these devices fulfill their respective, particular objectives and requirements, the aforementioned patents do not disclose a new collapsible truck box cover. The inventive device includes a frame assembly being adapted to be removably mounted upon a truck box and including curved elongate support members and also including elongate cross members; and also includes a plurality of connectors interconnecting the elongate support members and the elongate cross members; and further includes a sheet of material being securely and removably fastened about the frame assembly.

In these respects, the collapsible truck box cover according to the present invention substantially departs from the conventional concepts and designs of the prior art, and in so doing provides an apparatus primarily developed for the purpose of providing protective shelter for the outdoors person.

SUMMARY OF THE INVENTION

In view of the foregoing disadvantages inherent in the known types of truck box covers now present in the prior art, the present invention provides a new collapsible truck box cover construction wherein the same can be utilized for providing protective shelter for the outdoors person.

The general purpose of the present invention, which will be described subsequently in greater detail, is to provide a new collapsible truck box cover which has many of the advantages of the truck box covers mentioned heretofore and many novel features that result in a new collapsible truck box cover which is not anticipated, rendered obvious, suggested, or even implied by any of the prior art truck box covers, either alone or in any combination thereof.

To attain this, the present invention generally comprises a frame assembly being adapted to be removably mounted upon a truck box and including curved elongate support members and also including elongate cross members; and also includes a plurality of connectors interconnecting the elongate support members and the elongate cross members; and further includes a sheet of material being securely and removably fastened about the frame assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new collapsible truck box cover which has many of the advantages of the truck box covers mentioned heretofore and many novel features that result in a new collapsible truck box cover which is not anticipated, rendered obvious, suggested, or even implied by any of the prior art truck box covers, either alone or in any combination thereof.

It is another object of the present invention to provide a new collapsible truck box cover which may be easily and efficiently manufactured and marketed.

It is a further object of the present invention to provide a new collapsible truck box cover which is of a durable and reliable construction.

An even further object of the present invention is to provide a new collapsible truck box cover which is susceptible of a low cost of manufacture with regard to both materials and labor, and which accordingly is then susceptible of low prices of sale to the consuming public, thereby making such collapsible truck box cover economically available to the buying public.

Still yet another object of the present invention is to provide a new collapsible truck box cover which provides in the apparatuses and methods of the prior art some of the advantages thereof, while simultaneously overcoming some of the disadvantages normally associated therewith.

Still another object of the present invention is to provide a new collapsible truck box cover for providing protective shelter for the outdoors person.

Yet another object of the present invention is to provide a new collapsible truck box cover which includes a frame assembly being adapted to be removably mounted upon a truck box and including curved elongate support members and also including elongate cross members; and also includes a plurality of connectors interconnecting the elongate support members and the elongate cross members; and further includes a sheet of material being securely and removably fastened about the frame assembly.

Still yet another object of the present invention is to provide a new collapsible truck box cover that is easy and convenient to set up.

Even still another object of the present invention is to provide a new collapsible truck box cover that can be easily and quickly taken apart when not needed by one person.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a side elevational view of a T-shaped connector of the present invention.

FIG. 5 is a side elevational view of a four-way connector of the present invention.

DESCRIPTION OF THE PREFERRED EMBODIMENT

Figure 1:
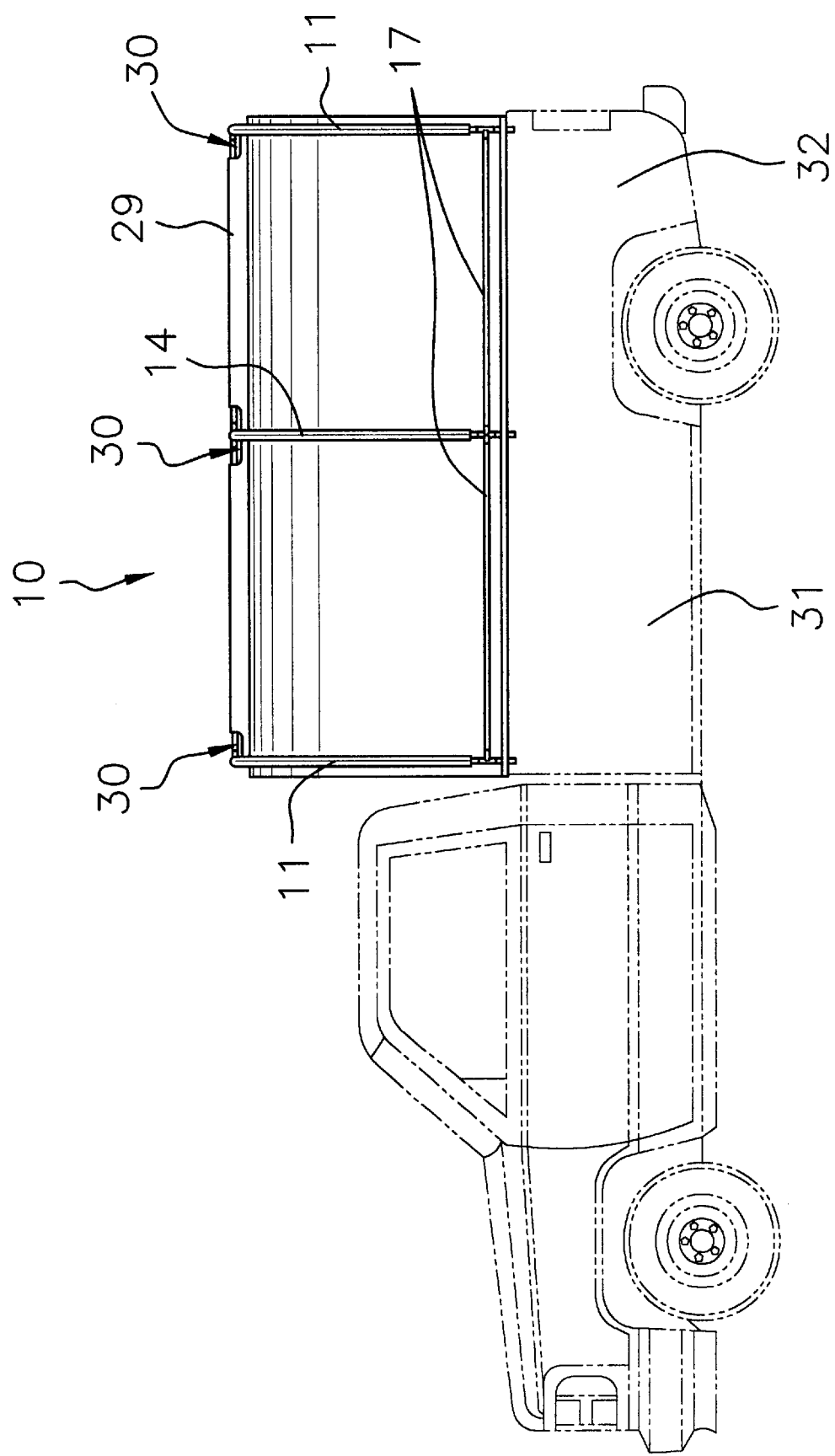
FIG. 1 is a side elevational view of a new collapsible truck box cover according to the present invention.
Figure 2:
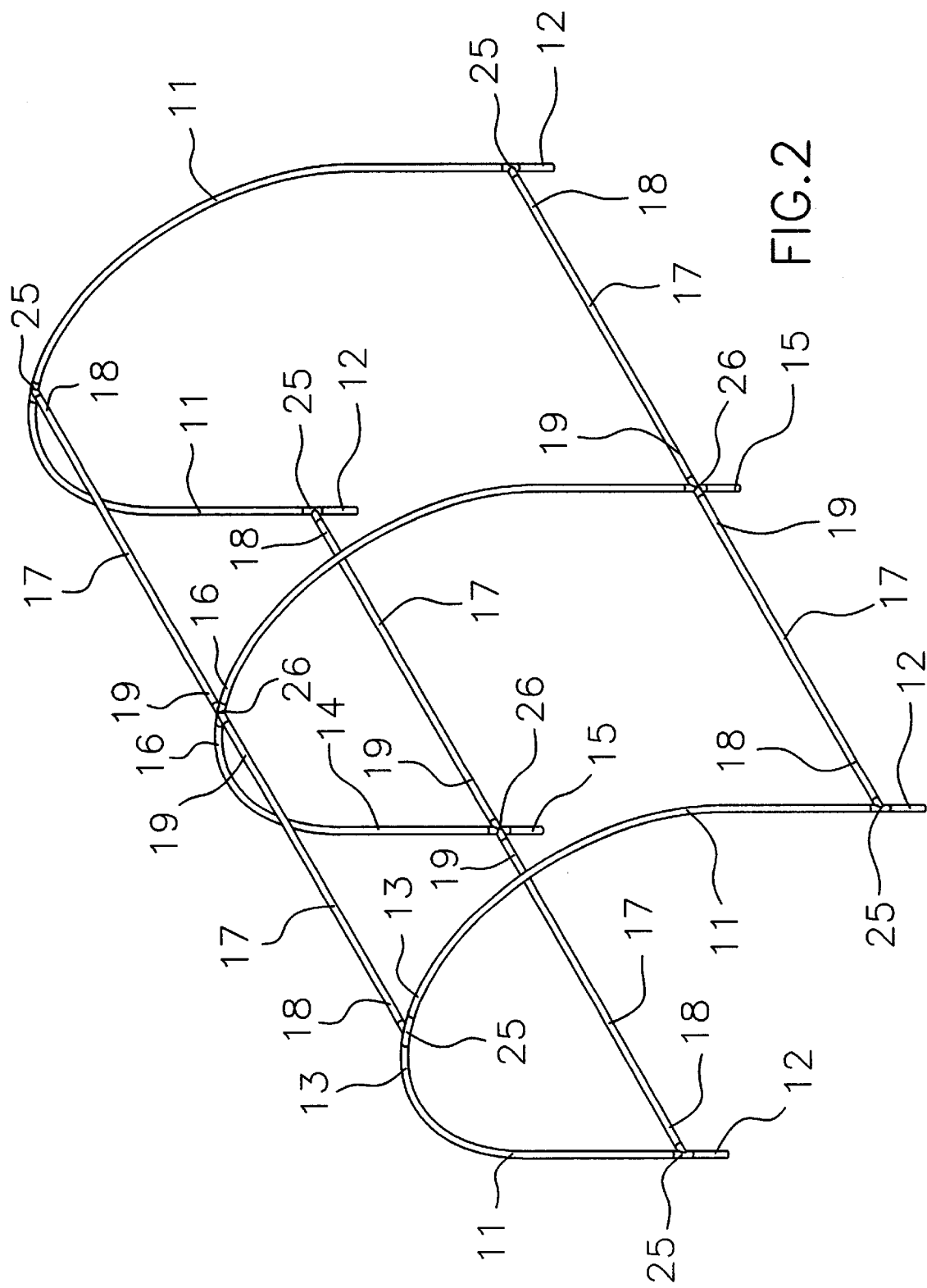
FIG. 2 is a perspective view of the frame assembly of the present invention.
Figure 3:
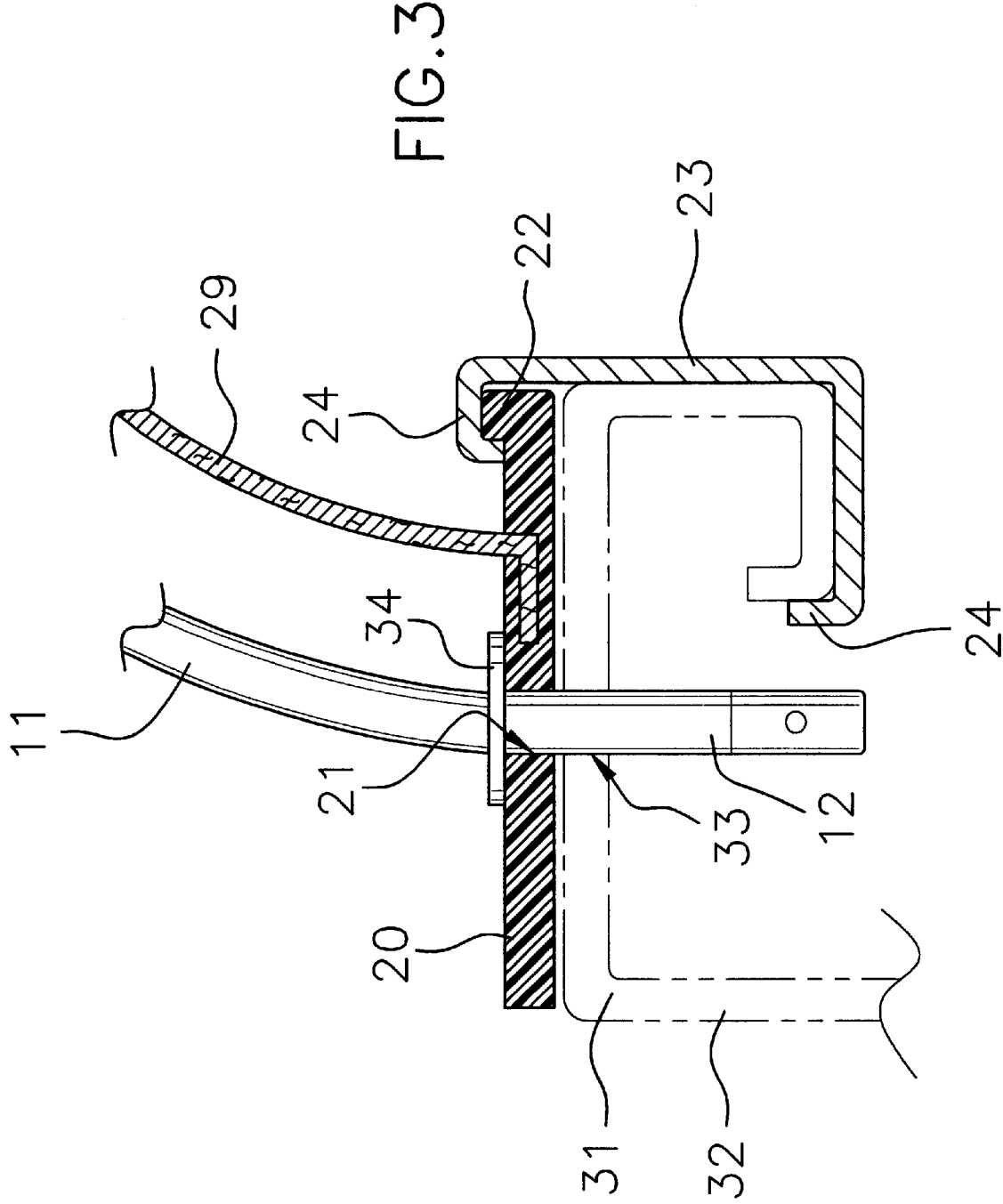
FIG. 3 is a detailed partial side elevational view of the frame assembly of the present invention.

With reference now to the drawings, and in particular to FIGS. 1 through 5 thereof, a new collapsible truck box cover embodying the principles and concepts of the present invention and generally designated by the reference numeral 10 will be described.

As best illustrated in FIGS. 1 through 5, the collapsible truck box cover 10 generally comprises a frame assembly being adapted to be removably mounted upon a truck box 31 and including curved elongate support members 11,14 and also including elongate cross members 17. The frame assembly further includes plate-like support members 20 each of which has a hole 21 therethrough and is adapted to rest upon a side wall 32 of the truck box 31, and also includes clamping members 23 each having hook-shaped ends 24,25 which engage about an end portion of a respective the plate-like support member 20 and which is also adapted to engage about a portion of the side wall 32 of the truck box 31. Each of the plate-like support members 20 has a flange 22 at the end portion thereof. Each of the curved elongate support members 11,14 has a first end 12,15 which removably disposed through the hole 21 of a respective plate-like support member 20 and which is adapted to be removably disposed in a respective slot 33 in the side wall 32 of the truck box 31, and also has a second end 13,16. The frame assembly further includes stop members 34 being securely disposed near the first ends 12,15 of the curved elongate support members 11,14 to set the depth of the curved elongate support members 11,14 in the slots 33 in the side walls 32 of the truck box 31. The curved elongate support members 11,14 include curved end support members 11 and curved intermediate support members 14.

A plurality of connectors 25,26 interconnect the elongate support members 11,14 and the elongate cross members 17. The connectors 25,26 include T-shaped tubular connectors 25 which receive end portions of the curved end support members 11 and first ends 18 of the elongate cross members 17, and also include four-way tubular connectors 26 which receive the second ends 16 and end portions of the curved intermediate support members 14 and second ends 19 of the elongate cross members 17. Each of the four-way connectors 26 includes tubular members 27 having open ends and also includes fastening members 28 being threaded through walls of the tubular members 27 for securely retaining the curved intermediate support members 14 and the elongate cross members 17 in the tubular members 27. A sheet of material 29 is securely and removably mounted about the frame assembly. The sheet of material 29 has edge portions which are disposed in the plate-like support members 20 and also has openings 30 through which the connectors 25,26 are disposed.

In use, the places personal belongings in the truck box 31 and can also take shelter in the truck box 31 under the sheet of material 29 which is supported by the frame assembly. When not needed, the user can quickly disassembly the frame assembly including the connectors 25,26 to store the collapsible truck box cover 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collapsible truck box cover comprising:
   a frame assembly for removably mounting upon a truck box and including curved elongate support members and also including elongate cross members;
   a plurality of connectors interconnecting said elongate support members and said elongate cross members;
   a sheet of material being securely and removably fastened about said frame assembly; and
   wherein said frame assembly further includes plate-like support members each of which has a hole therethrough and is adapted to rest upon a side wall of a truck box, and also includes clamping members each having hook-shaped ends which engage about an end portion of a respective said plate-like support member and which is also adapted to engage about a portion of the side wall of the truck box, each of said plate-like support members having a flange at said end portion thereof.

2. A collapsible truck box cover comprising:

a frame assembly for removably mounting upon a truck box and including curved elongate support members and also including elongate cross members, said frame assembly further including plate-like support members each of which has a hole therethrough and is adapted to rest upon a side wall of a truck box, and also including clamping members each having hook-shaped ends which engage about an end portion of a respective said plate-like support member and which is also adapted to engage about a portion of the side wall of the truck box, each of said plate-like support members having a flange at said end portion thereof, each of said curved elongate support members having a first end which is removably disposed through said hole of a respective said plate-like support member and which is adapted to be removably disposed in a respective slot in the side wall of the truck box, and also having a second end, said frame assembly further including stop members being securely disposed near said first ends of said curved elongate support members, said curved elongate support members including curved end support members and curved intermediate support members;

a plurality of connectors interconnecting said elongate support members and said elongate cross members, said connectors including T-shaped tubular connectors which receive end portions of said curved end support members and first ends of said elongate cross members, and also including four-way tubular connectors which receive said second ends and end portions of said curved intermediate support members and second ends of said elongate cross members, each of said four-way connectors including tubular members having open ends and also including fastening members threaded through walls of said tubular members for securely retaining said curved intermediate support members and said elongate cross members in said tubular members; and a sheet of material being securely and removably fastened about said frame assembly, said sheet of material having edge portions which are disposed in said plate-like support members and also having openings through which said connectors are disposed.

3. A collapsible truck box cover as described in claim 1, wherein each of said curved elongate support members has a first end which is removably disposed through said hole of a respective said plate-like support member and which is adapted to be removably disposed in a respective slot in the side wall of the truck box, and also has a second end, said frame assembly further including stop members being securely disposed near said first ends of said curved elongate support members.

4. A collapsible truck box cover as described in claim 3, wherein said curved elongate support members include curved end support members and curved intermediate support members.

5. A collapsible truck box cover as described in claim 4, wherein said connectors include T-shaped tubular connectors which receive end portions of said curved end support members and first ends of said elongate cross members, and also include four-way tubular connectors which receive said second ends and end portions of said curved intermediate support members and second ends of said elongate cross members.

6. A collapsible truck box cover as described in claim 5, wherein each of said four-way connectors includes tubular members having open ends and also includes fastening members threaded through walls of said tubular members for securely retaining said curved intermediate support members and said elongate cross members in said tubular members.

7. A collapsible truck cover as described in claim 1, wherein said sheet of material has edge portions which are disposed in said plate-like support members and also has openings through which said connectors are disposed.

8. A collapsible truck box cover comprising:

a frame assembly for removably mounting upon a truck box and including elongate support members and elongate cross members;

a plurality of connectors interconnecting said elongate support members and said elongate cross members;

a sheet of material being removably fastened about said frame assembly; and wherein said frame assembly further includes support members for resting upon a side wall of a truck box, each support member having a hole therethrough, clamping members each having hook-shaped ends which engage an end portion of a respective said support member and which is also adapted to engage about a portion of the side wall of the truck box, each of said support members having a flange at said end portion thereof.

9. A collapsible truck box cover as described in claim 8, wherein each of said elongate support members has a first end which is removably disposed through said hole of a respective said support member and which is adapted to be removably disposed in a respective slot in the side wall of the truck box, and also has a second end, said frame assembly further including stop members being disposed near said first ends of said elongate support members.

10. A collapsible truck box cover as described in claim 9, wherein said elongate support members include end support members and intermediate support members.

11. A collapsible truck box cover as described in claim 10, wherein said connectors include T-shaped tubular connectors which receive end portions of said end support members and first ends of said elongate cross members, and also include four-way tubular connectors which receive said second ends and end portions of said intermediate support members and second ends of said elongate cross members.

12. A collapsible truck box cover as described in claim 11, wherein each of said four-way connectors includes tubular members having open ends and also includes fastening members threaded through walls of said tubular members for securely retaining said intermediate support members and said elongate cross members in said tubular members.

13. A collapsible truck cover as described in claim 8, wherein said sheet of material has edge portions which are disposed in said support members and also has openings through which said connectors are disposed.

* * * * *